Mar. 20, 1923.

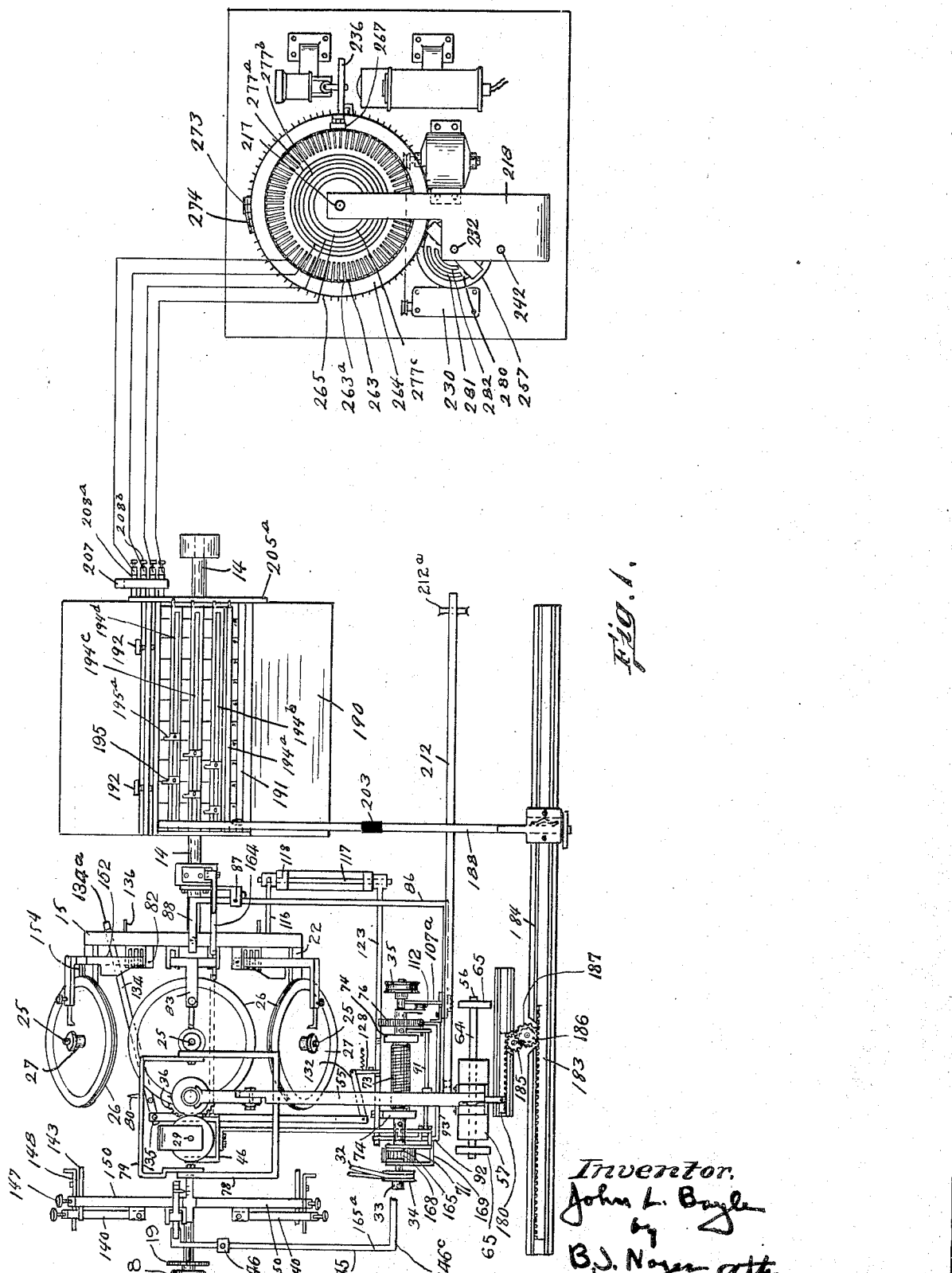

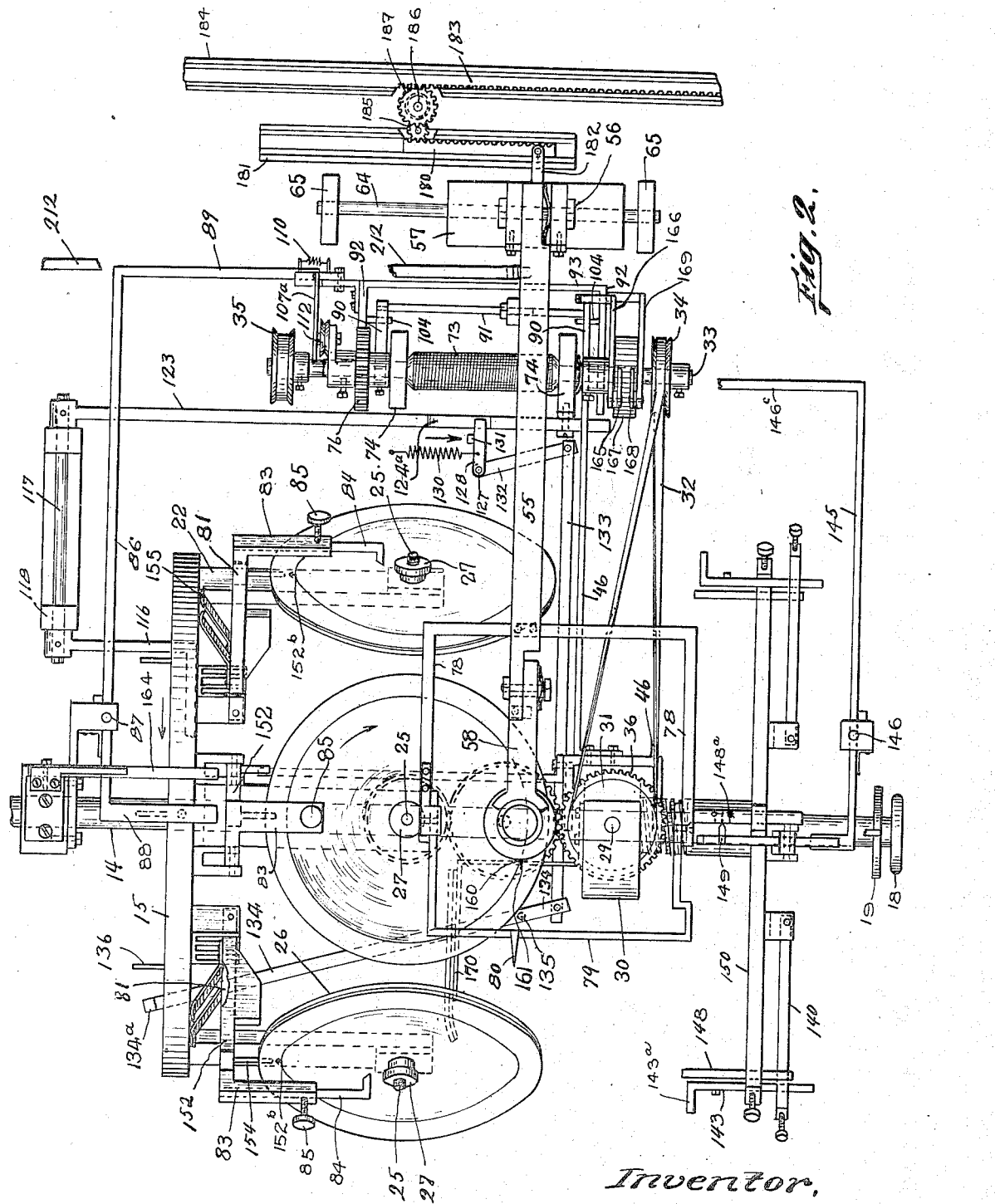

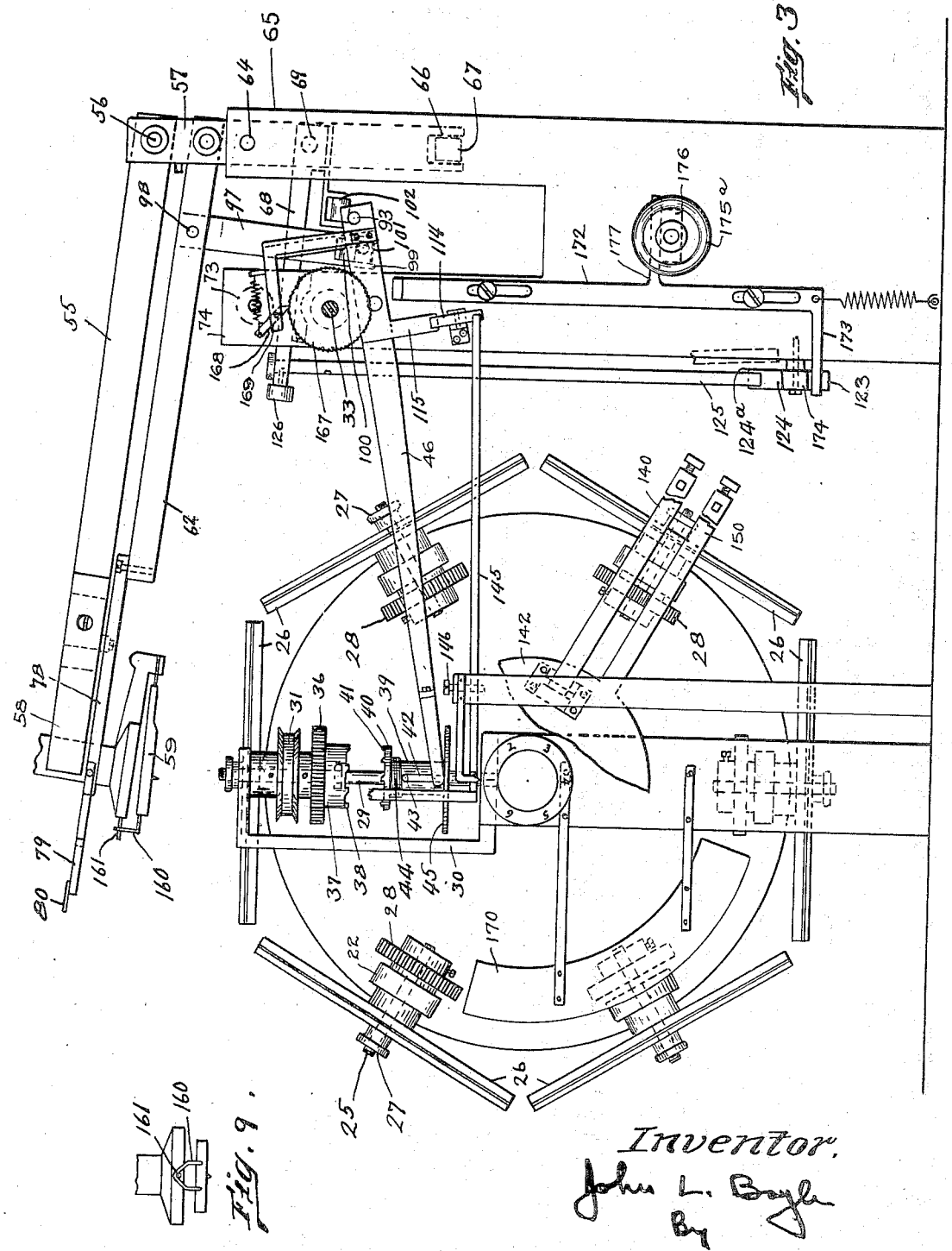

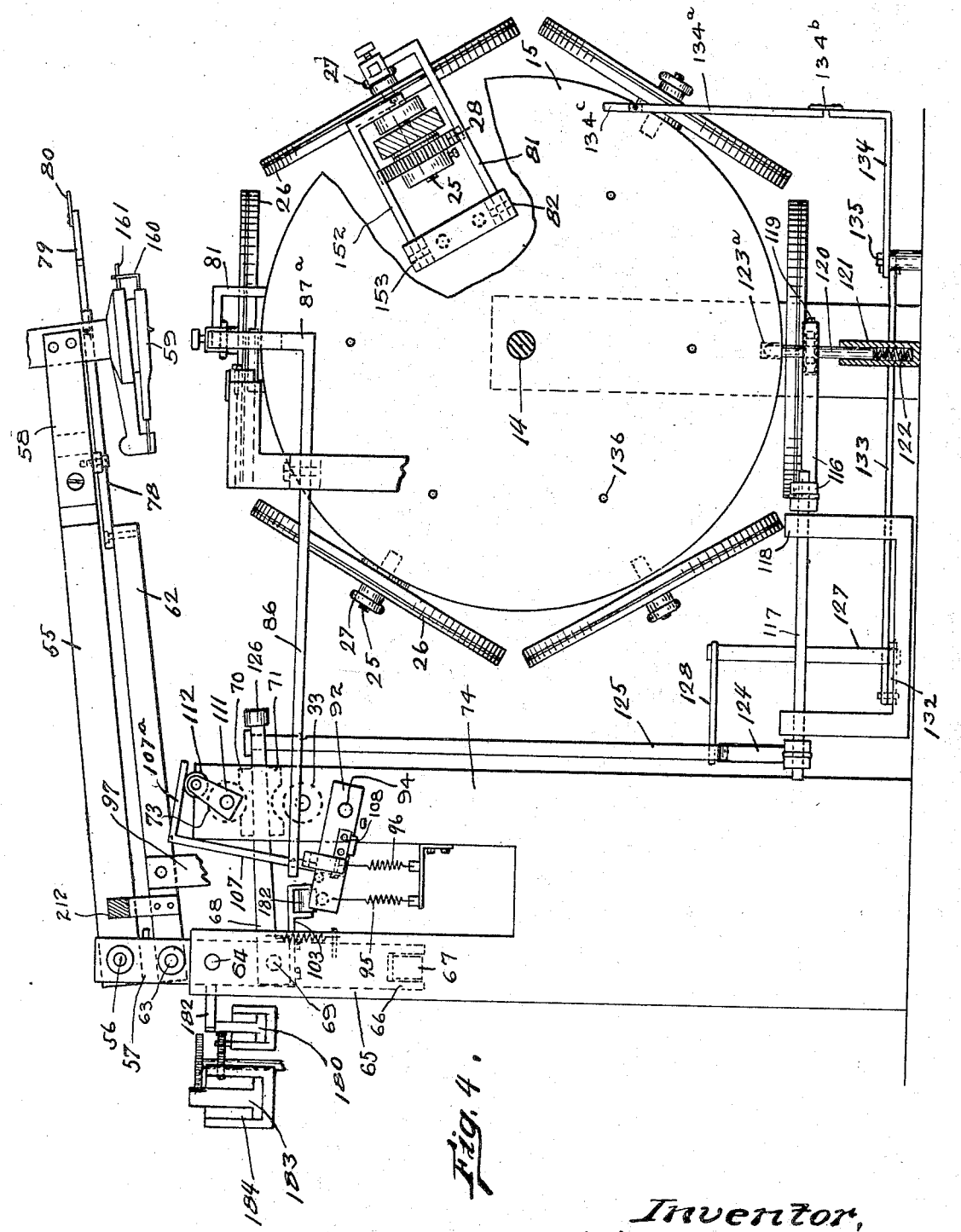

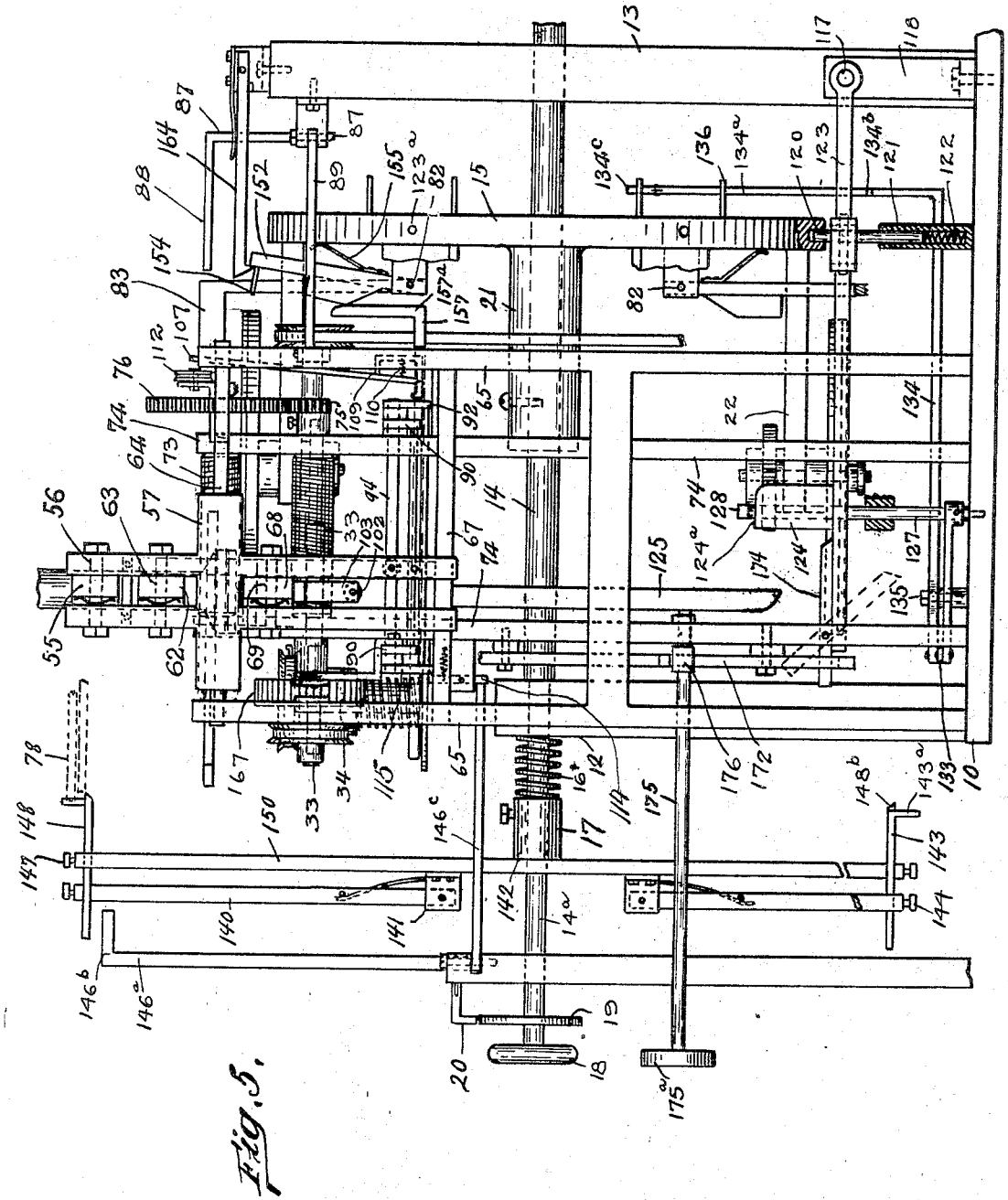

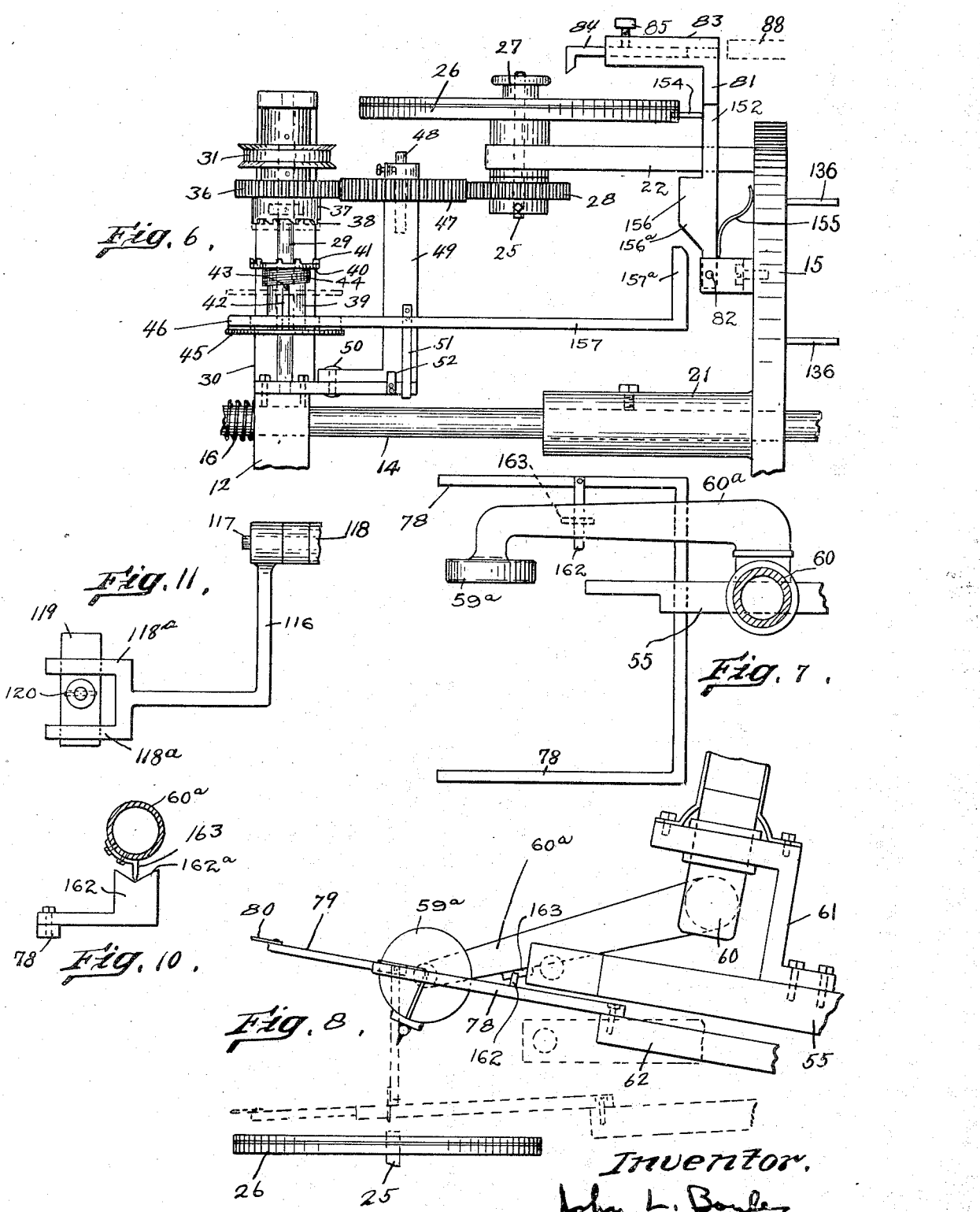

J. L. BOYLE.
COMBINED TALKING AND PICTURE EXHIBITING MACHINE.
FILED MAY 16, 1919.

Inventor,
John L. Boyle
by
B. J. Noyes atty

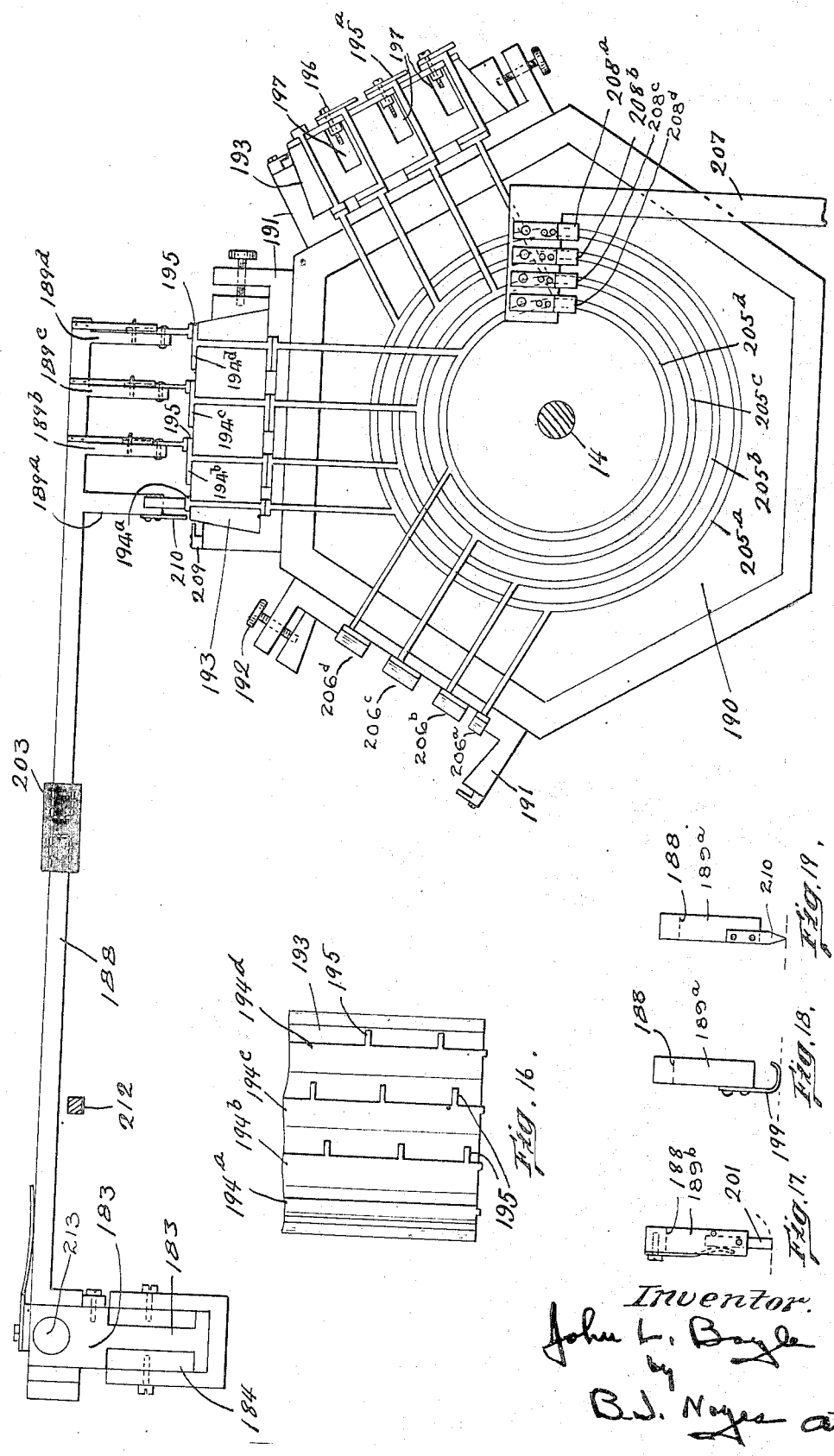

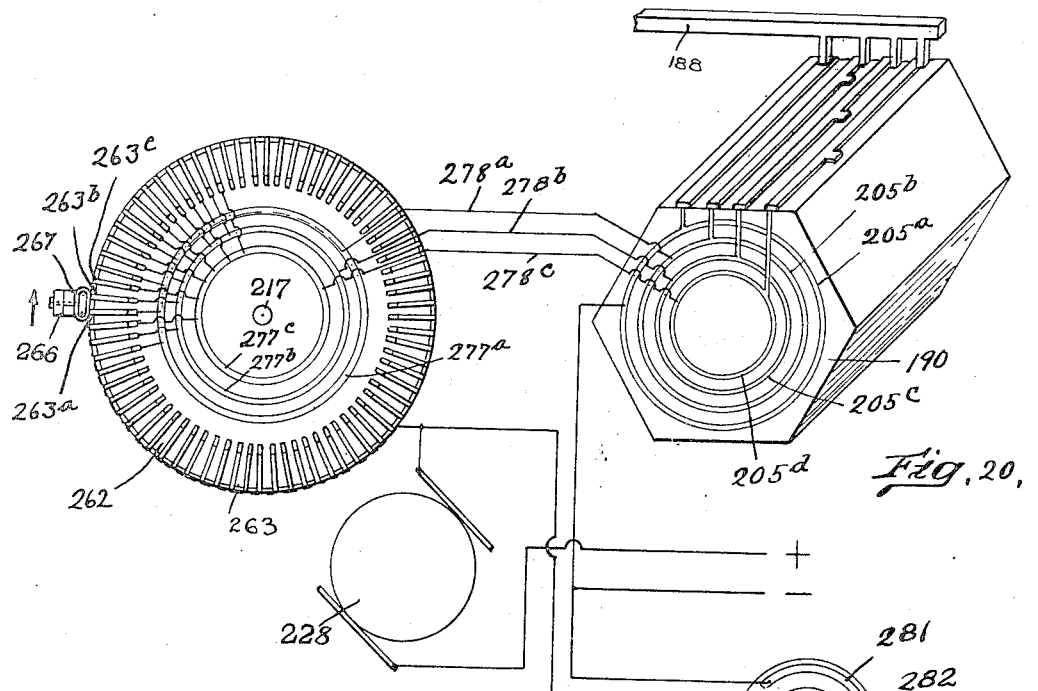

Patented Mar. 20, 1923.

1,448,784

UNITED STATES PATENT OFFICE.

JOHN L. BOYLE, OF BOSTON, MASSACHUSETTS.

COMBINED TALKING AND PICTURE-EXHIBITING MACHINE.

Application filed May 16, 1919. Serial No. 297,600.

*To all whom it may concern:*

Be it known that I, JOHN L. BOYLE, a citizen of the United States, and resident of Boston, in the county of Suffolk, in the State of Massachusetts, have invented an Improvement in Combined Talking and Picture-Exhibiting Machines, of which the following is a specification.

This invention relates to a combined talking and picture exhibiting machine of the type in which the contents of a plurality of records are presented and pictures to illustrate such contents are at the same time presented and is an improvement on the machine disclosed in my co-pending application Serial No. 829,968, filed April 6, 1914, and Serial No. 879,280, filed December 28, 1914.

An object of my invention is to provide means whereby the reproducer may be caused to be removed from engagement with the record immediately at the end of the story thereon, which point may vary with different records, and to initiate its return movement whereby the period of delay between the presentation of stories and pictures is reduced and the operation of the machine improved.

This result is attained in the provision of an adjustable member for each record which is set to indicate the end of the story on the record and which, when engaged by the reproducer or equivalent at the desired point in its path of movement, is moved to adjust the reproducer driving mechanism for its return movement.

Another object of my invention is to provide means whereby the reproducer and the controller for the picture exhibiting machine, or stereopticon, is set in motion previous to the actual engagement of the stylus of the reproducer with the record at the beginning of the story thereon, whereby lost motion between the component parts thereof is eliminated and accurate and synchronous operation of the combination may result.

A further object is to provide for the presentation of one or more pictures or announcements by the stereopticon previous to the presentation of the story on a record, to announce or introduce said story, or for other purposes.

Another object is to cause the stylus of the moving reproducer to engage the stationary record accurately at the beginning of the story on the record which point may vary with different records, and thereafter start the record in rotation for the presentation of its story.

These results are accomplished by causing the reproducer to be returned by its return screw to the beginning of the record, and beyond such beginning, until it, or an equivalent moving part, engages a stop member to move it, and, by such movement, cause the reproducer to initiate its return or playing movement. The stop member is adjustable to govern the extent of movement of the reproducer beyond the beginning of the story on the record whereby the stereopticon may be adjusted to present a variable number of announcements previous to the presentation of the story by the talking machine. During such portion of its movement the reproducer is held above the record by an adjustable member from which it is released to contact with the stationary record at the beginning of the story thereon, which release is provided by the proper adjustment of said member, and the record is immediately started in rotation for the presentation of the story thereon.

A further object of my invention is to provide a controller for the stereopticon whereby, if, because of poor electrical contact or for other reason, the stereopticon does not operate to present the next picture in the series at the proper period, at the next control period thereof by the controller, the stereopticon is caused to operate twice; or if the stereopticon fails to operate when controlled by the controller, when it does operate, it is caused to operate without intermission the entire number of operations previously unperformed, whereby the stereopticon regains synchronism with the talking machine.

The result is accomplished by the provision of a commutator controller controlled by the stereopticon having a plurality of similar segments or conducting portions, the number of similar segments corresponding to the number of possible successive stereopticon operations desired upon operation after a failure to operate. Each group of segments is associated with an electric circuit governed by a controller controlled by the talking machine and a brush member is associated with the commutator adapted to bridge a plurality of commutator segments whereby the stereopticon control circuit is properly controlled for the results desired.

Another object of my invention is to provide the machine with means whereby the dissolving effect of successive pictures is attained whereby the performance of the machine is improved.

Figure 1 is a plan view of a combined talking machine and picture-exhibiting machine embodying my invention.

Fig. 2 is a plan view of the talking machine.

Fig. 3 is an end view of the talking machine from the control end thereof, several parts being broken away and others shown in section.

Fig. 4 is an end view of the talking machine from the controller end thereof, several parts being broken away and others shown in section.

Fig. 5 is a rear elevation of the talking machine.

Fig. 6 is a detail of the record driving means.

Figs. 7 and 8 are plan and sectional details respectively of a modified form of reproducer associated with the controller.

Fig. 9 is a detail of the centering means for the reproducer.

Fig. 10 is a detail of the centering means for the reproducer shown in Figs. 7 and 8.

Fig. 11 is a detail of the record holder locking arm.

Fig. 15 is an end view of the controller and controller arm.

Fig. 16 is a plan detail of a controller unit illustrating the controller bar and projections thereof.

Figs. 17, 18 and 19 illustrate, respectively, the controller arm contact finger, brush member, and pointer.

Fig. 20 is a diagrammatic illustration of the controller, stereopticon, commutator and motor control circuit.

Fig. 21 is a sectional elevation of the stereopticon commutator.

Fig. 22 is a front view of the commutator brush member.

Fig. 23 is a plan view of the stereopticon lamps controller for obtaining dissolving effects.

Figures 12, 13:
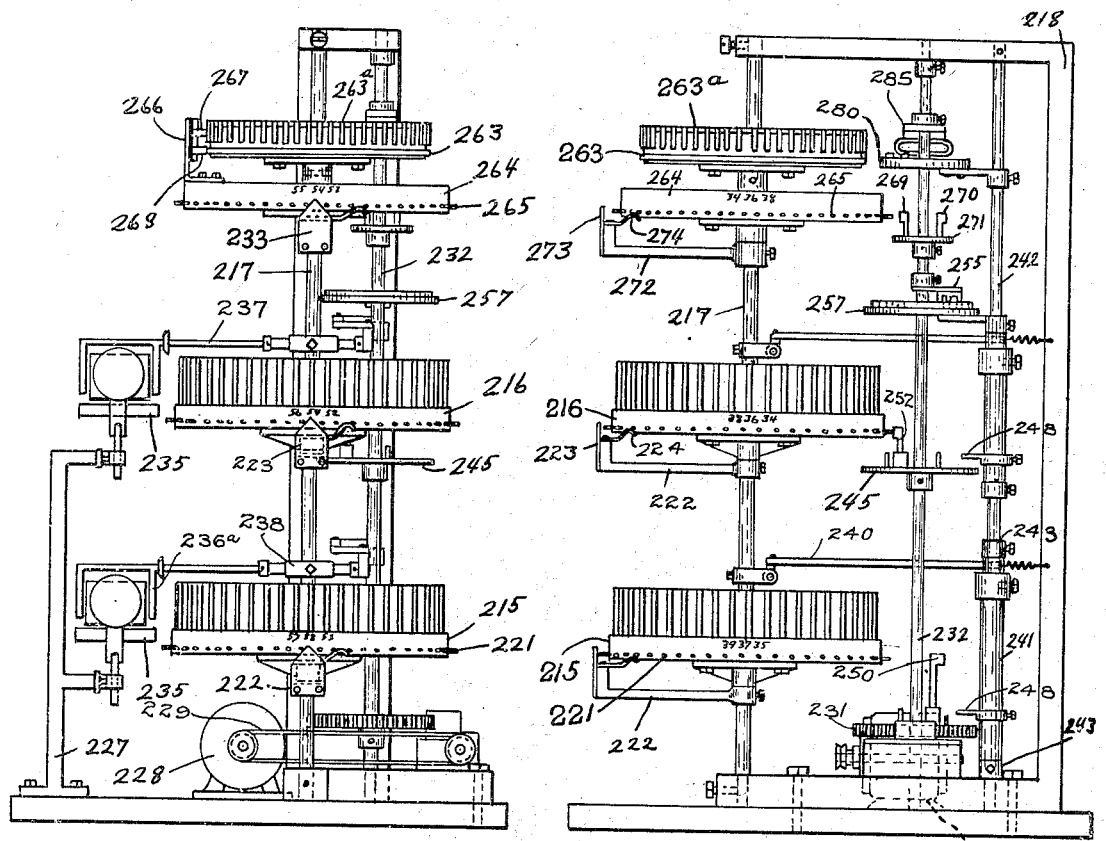
Fig. 12 is an end elevation of the multiple slide, dissolving view picture exhibiting machine.
Fig. 13 is a side view of the machine of Fig. 12.

As here shown the talking and picture exhibiting machine includes a multiple record talking machine having provision for the reception of disc records and for the presentation of the contents thereof.

The talking machine is mounted on the base 10 from which rise the standards 12, and 13 in which the shaft 14 bearing the plurality of disc records carried by the record disc carrier 15 is journalled. The shaft is provided with a reduced portion $14^a$ at the standard 12 and a coiled spring 16 bearing against said standard and a hub 17 fixed thereto serves to take up lost motion of the shaft in an axial direction to thereby facilitate the accurate performance of the machine. The reduced portion $14^a$ of the shaft terminates in a knob or wheel 18 by which the shaft may be manually rotated. Said portion of the shaft is also provided with a dial 19 bearing numbers indicating the position of records carried by the record carrier and an indicator 20 serves to indicate the number of the record in position to be played. By the provision of said knob 18 the machine may be adjusted to play a selected one of the plurality of records carried thereby.

The recorder holder 15 is formed for convenience, as a disc extended radially on the shaft 14 and has a hub 21 by which it is secured to said shaft. Said disc, at its periphery, is formed with a number, as here shown, six, equally spaced apart arms 22 extended axially of the shaft each of which serve to support a disc record.

The turn table for the disc record comprises the shaft 25 extended through and bearing in said arm 22 and a turn table 26 is fixed thereto upon which the record is supported, and to which it is secured by the screw 27. A gear 28 is fixed to said shaft by which the disc is rotated.

In other than playing position each record is remote from a driving means and previous to being driven is locked in a predetermined position by means hereinafter to be described. As the record holder is successively moved forward to present a new record for the presentation of the contents thereof the gear 28 is moved into operative engagement with the driving means.

The driving means comprises the shaft 29 supported and journalled at its ends in the supporting bracket 30 extended above and secured to the support 12 of the machine. A pulley 31 is fixed to said shaft and is adapted to be driven through the half-turn belt 32 from the reproducer lead screw 33 to which is secured the pulley 34 engaging said belt. Said lead screw is provided with a pulley 35 for driving connection with a source of power, not shown.

A gear 36 is loosely arranged on said shaft 29 and is provided with a clutch element 37 having the clutch teeth 38. The co-operating clutch element is slidably arranged on said shaft and comprises the hub 39 formed with the end flange 40 having teeth 41. Said latter clutch element is adapted to be moved into engagement with the clutch element 37 for the driving thereof. Said hub has a slot 42 therein in which a pin 43 fixed to said shaft 29 is arranged and by which the hub is rotated by said shaft. A coiled spring 44 encircling said hub between said pin and flange 40 normally tends to maintain the two components of the clutch in engagement for the driving of the gear 36 but such driving engagement is normally prevented by controlling means. A radial flange 45 is formed on said hub 39 which is engaged by the forked end of a clutch control lever 46 the movements of which are controlled by mechanism hereinafter to be described.

An idler gear 47 carried by the shaft 48 supported in the standard 49 is in mesh with said gear 36 whereby the rotation of said gear 36 is conveniently transmitted to the gear 28 associated with the individual records.

As the record holder is moved to present a fresh record for playing, the gear 28 of said record is rolled into engagement with the idler to be driven by the gear 36, and, as the record is moved away, after playing, the gear is rolled out of engagement with said idler.

The standard 49 by which said idler is supported is pivoted at 50 and is permitted a restricted angular movement about said pivot to facilitate the engagement of its gear by the record gear. Spring 51 serves to return the standard to its normal position against the stop 52.

The operation of the clutch is such that after the proper record has been moved into position under the reproducer, the lock thereof is removed and the clutch elements are permitted to engage by the raising of the clutch control member or rod 46, whereby the record is driven.

The reproducer is carried by the reproducer arm 55 which is pivotally secured at 56 between the extended arms of the reproducer carriage 57. Said arm is provided with a terminal portion 58 to which the reproducer 59 is detachably secured. For records necessitating a different type of reproducer, the modification of reproducer support illustrated in Figs. 7 and 8 is used. In this modification the reproducer 59$^a$ is universally supported at 60 from the standard 61 secured to said arm 55.

A reproducer controller arm 62 is pivotally connected at 63 to the carriage 57 and extends beneath the reproducer arm and supports said arm in the elevated position thereof.

The reproducer carriage is slidably arranged on and supported by the rod 64 extended between the uprights or standards 65 rising from the base 10. Said carriage extends beneath said rod and is formed with a forked end portion 66 slidably arranged on the guide bar 67. An arm 68 is pivoted at 69 to said carriage below the pivotal support of said carriage and is extended between the feed and return screws and bears two half nuts 70 and 71 of which 70 is to engage the return screw and 71 the feed screw.

The return screw 73 is supported above and spaced apart from the feed screw 33 in the supporting standards 74. Said return screw is driven from the feed screw through the gear 75 fixed thereto which meshes with the gear 76 fixed to the return screw shaft.

For the operation of the various control devices by which the accuracy of the presentation of the contents of the records and the pictures illustrating such records is obtained, the reproducer control arm 62 is provided with the U-shaped member having the arms 78 secured thereto and extending on each side of the reproducer. A frame 79 is pivotally secured to said arms 78 and bears the pointer 80 which is arranged in alignment with the stylus of the reproducer. Said frame is adapted to be moved about its pivotal supports to move the pointer 80 adjacent the record whereby the reproducer may be accurately set over the beginning and end of the story on the record and the accurate adjustments of the control members thereby facilitated.

Means are provided whereby the reproducer is caused to be raised from the record immediately at the end of the story thereon and caused to be moved toward the beginning of its path of movement. Said means include the arm 81 pivotally supported at 82 to the record holder and extended above the record turn table carried thereby. Each table has such an arm associated therewith. Said arm is provided with a part 83 extended over the record which has an opening therein in which the stop member 84 is adjustably received and secured in any adjusted position by the clamping screw 85. Said stop member has an end portion in the form of a pointer which is adapted to be set above the end of the story on the record. During the movement of the reproducer in engagement with the record the arm 78 carried by the reproducer control arm 62 is moved in proximity to said member 84 and, near the end of its movement engages and moves it backward for the control of mechanism by which the reproducer is caused to be raised from the record and returned to the beginning of a record.

A lever 86, see Fig. 2, pivoted at 87 serves as a means by which the movement of said member 84 is transmitted to the reproducer return mechanism. Said lever is formed with an upright extension 87$^a$, (see Fig. 5,) and a longitudinal terminal portion 88 terminating adjacent the arm 81 in which the stop member 84 is carried. The other end of said lever 86 is extended in a more or less rigid angular portion 89, (see Fig. 2,) to a position adjacent the feed and return screws for engagement with mechanism hereinafter to be described.

The control of the reproducer is effected through two control frames, an inner frame formed with the two side arms 90 and connecting rod 91; and the outer frame formed with the two side arms 92 and connecting rod 93. Both of said frames are independently and concentrically pivoted to the pin 94 extended between the standards 74 beneath the feed and return screws. Springs 95 and 96 tend to move said frames to a low position.

A link 97 is pivotally connected at 98 to the reproducer control arm by which said arm is moved to control the engagement of the reproducer with the record. Said arm is formed with a forked end portion 99 in which a roll 100 is pivotally secured and by which said link and arm are movably supported by the connecting rod 91 of the inner frame. The forked portion 99 extends below said rod 91 and a pin 101 connects the two arms of the fork thereby securing said link 97 to said arm against removal therefrom.

A roll 102 is secured to a component part of the feed nut arm 68, as the part 103, which roll is in rolling engagement with the connecting rod 93 of the outer frame by which the engagement of said nut arm 68 to either the feed screw or return screw is controlled.

Said two control frames are adapted for conjoint movement upward, upon a movement of the outer frame in such direction, by the stops 104 extending from the outer frame side arms 92 beneath the inner frame side arms 91, but said frames may move downward independently of each other.

Figure 24:
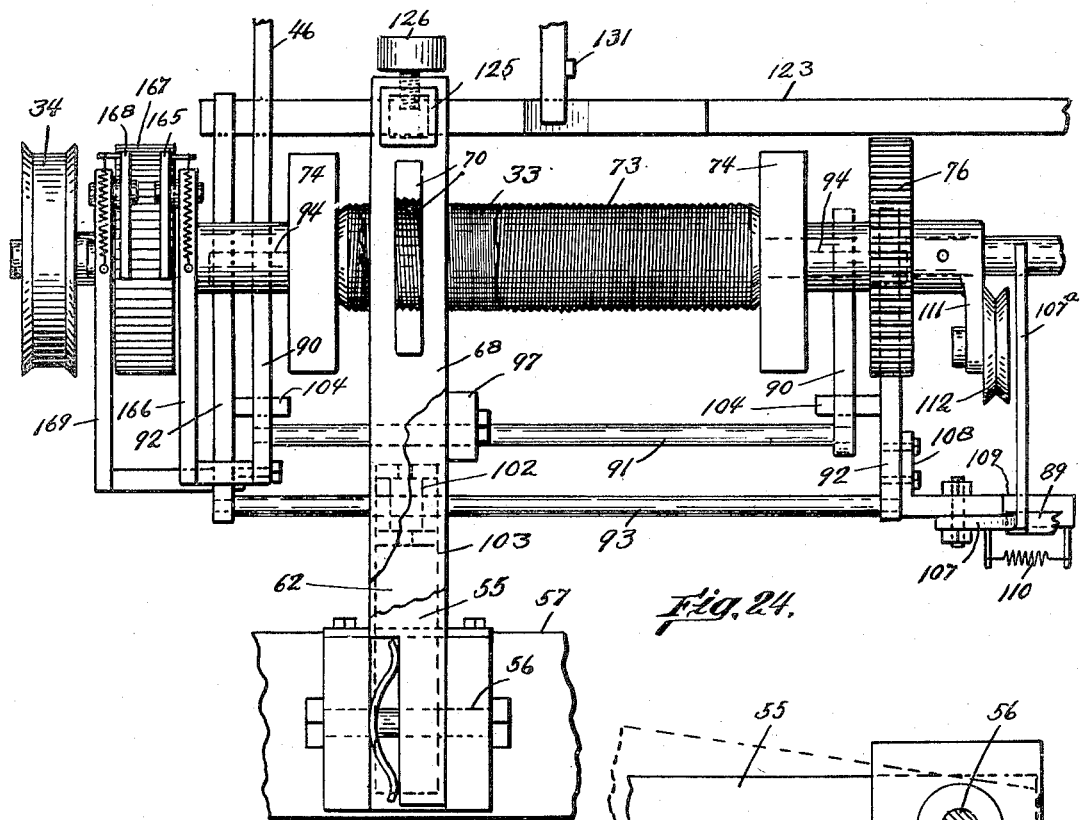
Fig. 24 is a plan view, in detail, of the reproducer returning screw and associated mechanism, illustrating particularly the means for gradually lowering the reproducer into engagement with a record.
Figure 25:
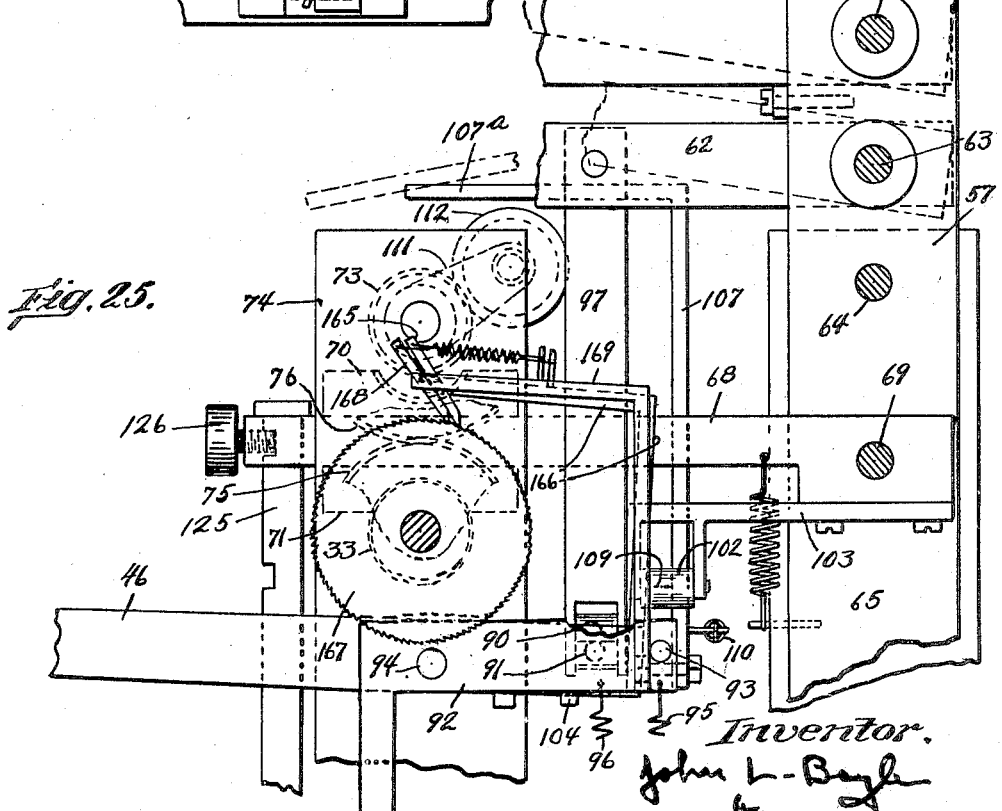
Fig. 25 is a side elevation of Fig. 24.

The means whereby the reproducer carriage is shifted from the feed screw to the return screw includes the lever 107 pivotally supported by the supporting member 108 secured to the side arm 92 of the outer contact frame disposed near the end of the feed and return screws. Said lever is normally held against the stop 109 formed on said member 108 by the spring 110, and inclined outwardly a slight degree, as shown in Fig. 5 and Fig. 24. An arm 111 is fixed on said return screw shaft at the end thereof to which said lever 107 is adjacent. A grooved wheel 112 is pivotally supported by the extremity of said arm and is carried with its arm, about the return screw in its rotation. Said wheel serves as a cam wheel.

While the reproducer carriage is moving forward to present the contents of a record, the pivoted arm 107 is in the position illustrated in Fig. 5 and Fig. 24. When, however, the arm 78 of the U-shaped member carried by the reproducer control arm 62 engages with the stop member 81, it moves said member backward and causes the movement of the lever 86 associated therewith. Upon such movement, the end 89 thereof engages said pivoted arm 107 to move it into the path of movement of the cam wheel 112. Said wheel is moved beneath the reflexed end 107$^a$ of said arm and raises it and the outer control frame to which the arm is pivoted and consequently the inner control frame, thereby raising the feed nut 71 from engagement with the feed screw and causing the engagement of the return nut 70 with its screw. The reproducer is also raised from the record by the moving upward of the link 97. The two control frames with associated mechanism are locked in raised position by engagement of the latch 114, Figs. 3 and 5 pivotally supported by the standard 74, with the hooked and dependent end 115 of the outer side bar of the outer control frame.

The clutch rod or arm 46 is secured to, or formed as an extension of, a side bar 90, of the inner control frame and when said frames are moved upward to cause the return of the reproducer toward the beginning of a record, said bar is moved downward to some position as shown in Fig. 3, to cause the disengagement of the record driving means, thereby permitting the record holder 15 to be moved to present a fresh record.

The record holder, however, is locked in position against movement and is adapted to be unlocked previous to the completion of movement of the reproducer. The record holder locking means comprises the arm 116 fixed to the end of a shaft 117 journalled in the support 118. Said arm 116 is extended beneath the disc of the record holder and terminates in the two spaced apart arms 118$^a$ as shown in Fig. 11, having slots therein in which the plate 119 bearing the locking pin 120, is slidably arranged. Said pin 120 is guided in a vertical movement by the post 121 in which it is slidably received and spring pressed in to engagement with said record holder by the spring 122. As many holes or recesses 123$^a$ are formed in the periphery of the holder as there are record turn tables and the recesses and locking pin are so relatively positioned that with the pin in any recess, the holder is locked in position with a record under the reproducer in position for playing.

The shaft 117 to which the arm 116 is secured has an arm 123 fixed to the other end thereof which extends beneath the reproducer carriage in the direction of the movement thereof. A cam member 124 is secured thereto about midway the extent of the reproducer and is adapted to be engaged and depressed by a component of the reproducer carriage to consequently depress the locking arm 116 and the locking pin 120 to permit the presentation of a new record for playing. For this purpose the arm 68 bearing the feed and return nuts has a rod 125 detachably fixed thereto by the thumb screw 126 and depending therefrom to a point adjacent said cam 124. In that position of the arm 68 in which it engages the feed screw and the reproducer is being moved over the record it is obvious that the lower end of said depending rod 125 will assume such a position, as shown in dotted lines Fig. 3, to clear said cam 124. During the return movement of the reproducer carriage, however, the rod will assume a position as in Fig. 3. Upon a sufficient movement of the reproducer carriage the end of said rod 125 will be moved in contact with the inclined face of the block 124 and move it and the arm 123 to which it is secured downward to withdraw the locking pin 120 from locking engagement with the record holder. Said cam 124 is formed with a flat top 124$^a$ by the engagement of which with the end of said rod 125 the cam is maintained in a depressed position for a considerable period, to permit the turning of the record holder. After the rod 125 has been moved past the end of the cam 124 the locking pin is moved into locking engagement with the record holder and retained in such engagement by the spring 122.

After the record holder has been unlocked, a further movement of said rod 125 is utilized to rotate the record holder. For this purpose a shaft 127 is provided which is supported by suitable bearings not necessarily shown and an arm 128 is secured thereto. Said arm extends over the top of the cam 124 about intermediate the flat or dwell portion 124$^a$ thereof, and after said cam has been engaged and moved downward by the rod 125, said rod is adapted to engage the arm 128 to partially rotate it as indicated by the arrow Fig. 2, against the tension of the retractile spring 130 away from the stop 131, against which said arm is normally drawn. A second arm 132 is fixed to said shaft 127 and a link 133 is pivotally connected thereto. Said link extends and is pivotally connected to a lever 134 pivoted at 135 which serves to rotate the record holder. Said lever 134 extends to a point beneath the record holder and formed with an upwardly extended portion 134$^a$ which is adjacent to and movable over the face of the record holder disc 15. Said disc is provided with a plurality of pins 136 adapted to be engaged by said extended portion 134$^a$ of said lever 134 and when said lever is partially rotated by the rod 128 through the arm 132 and link 133 the holder is moved to bring a new record into position. Said extended portion 134$^a$ is formed with a spring strip 134$^b$ interposed between two sections thereof for resiliency, and the extremity thereof is provided with the snap finger 134$^c$ whereby to permit the retraction of said extended portion beyond a rear pin.

Means are provided whereby the reproducer stylus may be moved to the beginning of the new record, or it may be moved beyond the beginning of the story thereon and then moved back on the playing stroke, without, however, engaging the record. During the movement of the reproducer on the forward stroke previous to its engagement with the record, the controller associated therewith, hereinafter to be described, and governed by the movements of the reproducer, may control the picture exhibiting machine or stereopticon to exhibit one, or several, announcement or other slides which may or may not relate to the story about to be presented by the talking machine.

Said means include the arms 140, one for each record, which are pivotally supported at 141 to a disc 142 secured to the hub 17 by which it is fixed to the shaft 14 of the machine. Said arm 140 is extended upwardly above the record turn table and has a squared passage therethrough at its upper end, in which the stop member 143 is adjustably secured and fixed in adjusted position by the clamping screw 144. Said stop member terminates in an upturned portion 143$^a$ which is adapted to be engaged by an arm 78 extended from the reproducer control arm 62 during the latter part of its return movement, and it and the pivoted arm 140 are moved backward thereby to adjust the mechanism for the return or playing movement of the machine. Said stop member 143 is so positioned that it is engaged by the arm 78 to cause the return of the reproducer at the desired point, which may vary with different records.

The shifting of the reproducer carriage from the return to the feed screw is performed by the lever 145 pivotally supported at 146 to a supporting standard of the machine. Said lever is formed with a vertical extension 146$^a$ having a terminal portion 146$^b$ in proximity to said arm 140 bearing the stop member 143. Said lever 145 has another extended portion 146$^c$ which extends to said latch 114 which locks the outer control frame in raised position and consequently the reproducer carriage in engagement with the return screw. Upon the backward movement of said arm 140 because of its engagement with the reproducer control arm, or equivalent, said lever 145 is moved to rotate said latch 114 about its pivotal support and cause it to release the outer control frame. Said outer control frame is consequently moved downward by its control spring and the nut 71 is moved into engagement with the feed screw. The inner control frame is also permitted to be released and may drop. The producer control arm 62, however, may be maintained in elevated position and consequently said frame is retained in raised position, whereby the clutch is held from driving engagement with the record which has previously been moved into playing position.

The means whereby the reproducer control arm 62 may be retained in raised position comprises the member 148, one for each record. Said member is adjustably secured by the set screw 147 to the arm 150 integrally with or otherwise fixed to said disc 142 somewhat to the side of said pivoted arm 140.

When the reproducer is being returned the arm 78 which engages the stop member 143 occupies some position as shown in the upper dotted lines Fig. 5. After it has engaged said stop member and the outer control frame has been unlocked, the arm 78 and the reproducer arm and its control arm fall slightly and said arm 78 assumes a position as indicated by the lower dotted lines, Fig. 5, in which position it is retained by said member 148. The reproducer is now being moved in a playing direction, without, however, being in engagement with the record, and the arm 148 slides over said member 78. This part of the movement of the reproducer may be utilized for the showing of announcements and the like by the stereopticon. The member 148 may bear a scale as at 148$^a$, and the stop member 143 a pointer 149 to indicate the setting of the stereopticon controller, hereinafter to be described, for the presentation of illustration by the stereopticon.

The member 148 is formed with a relatively abrupt and tapered end 148$^b$ which is adapted to be moved into contact with the U-shaped member pivotally secured to said arms 78, or equivalent in the setting up of the machine to relatively accurately correspond with the beginning of the story on the record.

When the reproducer has been moved a suitable distance on its playing stroke the arm 78 reaches the end of said member 148 and drops off, and the stylus of the reproducer engages the record at the beginning of the story thereon; the beginning of the record having been previously located and the record having been clamped to its turn table, which is locked in a predetermined position. The record, at the instant of reproducer engagement therewith, is stationary.

By the proper adjustment of said member 148 it may be seen that a very accurate engagement of the reproducer stylus with any predetermined point of the record may be made, whereby the accuracy of the combination is enhanced.

In view of the fact that the record center hole may sometimes be eccentric and may be greater in size than the pin on the record table, it is desirable that means be provided by which all the records may be placed in the same relative location on the turn table. A suitable means comprises an arrow, as 152$^b$, so applied to the records that when the arrow is adjacent the locking recess in the turntable and the records are moved in the direction of the arrow as far as the looseness of the hole therein will permit, and the records then clamped in position, they all will be in similar positions and in readiness for playing.

The reproducer stylus is arranged to engage the record a slight distance ahead of the beginning of the story thereon so that the record will be moving at its uniform playing speed at the beginning of the presentation of the story, thereby eliminating false tones due to acceleration of the record, as would otherwise be the case.

The permitted lowering of the reproducer control arm 62 moves the inner control frame downward. The clutch arm fixed thereto is consequently raised and the clutch members of the record driving means are permitted to engage to cause the rotation of the record; the record locking means having been previously unlocked.

The record locking means comprises the arm 152, one for each record table, pivoted at 153 to the record holder disc 15 and bearing a pin 154 at its upper end which is adapted to engage a locking recess in the record turn table and thereby restrain said table from rotation. Said arm is spring pressed into engagement with the record table by the spring 155 and said locking arm, by virtue of said spring, also serves to force the record table, with record thereon, as far to one side as the loose play of the turn table shaft in its bearings will permit, thereby holding the beginning of the story on the record in one particular position to be engaged by the reproducer stylus, and making for accuracy of playing and picture presentation, which could not otherwise obtain. Said locking arm 152 bears a cam block 156 having a tapered cam surface 156$^a$ adapted to be engaged by an unlocking arm to cause the disengagement of the locking pin 154 with said record table.

The unlocking arm 157 is fixed to the clutch arm and extends therefrom and terminates in an end portion 157$^a$ engageable with said cam block 156.

When said clutch arm is moved upward to cause engagement of the clutching elements, said arm 157 is carried upward and causes the disengagement of the locking pin 154 with the record table, and this disengagement occurs just before the clutch is conditioned for driving the record.

The arm 152 is locked in retracted position by the spring pressed latch member 164 pivotally supported on the standard 13 and is retained in retracted position until the record holder is turned for the presentation of a new record, during which movement said arm 152 is moved from beneath said latch member 164 to engage the record turn table.

The centering holes in the records are frequently eccentric and as the reproducer stylus must be in accurate adjustment relative to the reproducer and the supporting arm therefor, before engagement with the record, the reproducer arm is permitted a substantial movement independent of the reproducer, or at least that portion thereof bearing the stylus. This result is attained in that type of reproducer illustrated in Fig. 3, by providing the stylus portion thereof with a V-shaped loop of wire 160 and the reproducer body with a pin 161. When the reproducer is raised above the record the pin 161 is in the end of the V and the lower part of the reproducer is supported by said pin. When the reproducer is in engagement with the record the pin 161 is designed to be free from the top of the loop whereby the reproducer arm may move independently of the reproducer stylus. After the record is in rotation the reproducer is moved by the record. The same result is attained in the type of reproducer illustrated in Figs. 7 and 8 by affixing an arm 162 having a V-shaped top edge 162ᵃ to the arm 78 carried by the reproducer control arm and providing the reproducer 60ᵃ with a knife edge member 163 which is normally centered in the bottom of the V of said member 162. By this means the necessary accurate adjustments for the engagement of the stylus at the exact beginning of the record may be made and yet entire freedom of operation result.

Although the reproducer has been described as dropping off the end of member 148, it is actually gradually carried into engagement with the record by the engagement of the pawl 165 carried by the arm 166 fixed to the inner control frame, with the rotating ratchet wheel 167 fixed to the driving screw shaft. The outer control frame and associated mechanism is also gradually moved into position by a similar pawl 168 carried by an arm 169 carried by said outer control frame.

The sequence of events from the finish of a selection on a record to the beginning of the presentation of the selection of the next record is unclutching of record turn table, raising of reproducer and locking in raised position, initiation of return of producer, unlocking of record holder, turning the record holder, release of turn table locking arm and the movement of turn table, locking of record holder, unlocking of reproducer in raised position for showing of announcements, total lowering of reproducer into engagement with record and driving of record for presentation of selection thereon.

After a record has been unclutched it is not immediately locked against rotation but is permitted to come to rest and during the turning of the record holder, the driving gear 28 of the record table is moved beneath and in contact with a rubber faced plate 170 supported by the frame of the machine by which it is rotated into proper position to be locked by its locking arm and may slide on said plate during the remainder of the movement of the record holder.

Means are provided whereby the machine may be manually adjusted to present any record indiscriminately for playing, and the mechanism may also be in effect disabled to permit this to be accomplished. Said means comprise the member 172 slidably secured to a supporting standard and movable upward to such a position that it holds the arm 68 bearing the return and feed nuts 70 and 71 between their respective screws and thereby disengaged from either. An arm 173 projecting therefrom also serves to engage the latch 174 to depress it to remove the lock from the record holder whereby it may be manually rotated. Such movement of said member 172 is caused by the partial rotation of the shaft 175 bearing the rectangularly shaped block 176 in engagement with an arm 177 extended from said member. A turning handle 175ᵃ is arranged on the rod 175.

As in my aforesaid applications the movement of the reproducer of the talking machine is multiplied in the controller arm for the stereopticon. The multiplying means here shown comprises the rack 180 slidable in the bearing 181 carried by the frame of the talking machine and engaged by the arm 182 fixed to the reproducer carriage by which said rack is driven from said carriage.

A second rack 183 having magnified reproducer carriage motion and bearing the controller arm is slidably arranged in the bearing 184. Multiplying means comprising the gears 185, 186 and 187 serve to multiply the motion of the rack 180 in said rack 183.

A controller arm 188 is fixed to said rack 183 and extends over the controller and bears at its extremity several spaced-apart depending fingers 189ᵃ, 189ᵇ, 189ᶜ, and 189ᵈ which bear contact members.

The stereopticon controller comprises the hexagonal drum 190 having as many sides as there are records of the talking machine, fixed to the extended portion of the talking machine shaft 14 and rotatable therewith. The controller drum is so fixed to said shaft that the flat side is on top, or under the controller arm, when corresponding record is in playing position. Each flat side bears the controller unit support 191 having tapered side walls in which the controller units are slidably received and clamped by the screws 192.

The controller unit comprises a block 193 of insulating material having tapered side walls and bearing on its top surface a plurality of conducting bars $194^a$, $194^b$, $194^c$ and $194^d$ which may extend the length of the block. The bar $194^a$ is adapted to be entirely without lateral projections while said other bars may have projections as 195. Said projections may be either integral with said bars or separate therefrom and adjustably secured thereto as at $195^a$, in which case, said bars $194^b$, $194^c$ and $194^d$ are slotted to admit the passage therethrough of clamping bolts 196, and the block 193 is formed with slots 197 to receive said bolts.

Said finger $189^a$ of the controller arm 188 is provided with a brush contact member 199, (see Fig. 18,) which is adapted to be in continual contact with said bar during the movement of said controller arm. Said other fingers $189^b$, $189^c$ and $189^d$ are each provided with a spring pressed trip contact member comprising the bar 201 pivotally connected thereto which is adapted to engage the projections 195 or $195^a$ of said bars $194^b$, $194^c$ and $194^d$ for electrical contact therewith and move in engagement therewith during a certain extent of movement of said controller arm and thereafter quickly snap away therefrom and break the electrical connection. All of said contact members 201 carried by said fingers $189^b$, $189^c$ and $189^d$ are in permanent electrical connection with brush 199 through the metallic end portion of said arm, said end portion being insulated from the frame of the machine by the insulating bushing 203 interposed intermediate said arm 188.

The projections 195, or $195^a$ are adapted to be located on said bars $194^b$, $194^c$ and $194^d$ at points corresponding to points on the record at which it is desired to present a new illustration and the stereopticon control circuit is adapted to be made in succession through said bars $194^b$, $194^c$ and $194^d$, and then again in the same order for a purpose to be hereinafter described.

As there are four controller bars to each controller unit, four collector rings $205^a$, $205^b$, $205^c$ and $205^d$, are arranged on the outer end of the controller concentric with said shaft 14 and separate leads extend therefrom to plates $206^a$, $206^b$, $206^c$ and $206^d$ in each support 191 which are in detachable connection with said bars, whereby corresponding bars in all units are connected to the same collector ring.

A standard 207, supported by the frame of the machine bears four independent brushes $208^a$, $208^b$, $208^c$ and $208^d$ which engage said collector rings and stereopticon controller leads are connected thereto.

Each unit support may be provided with an indicator as 209 and each unit may also be provided with a scale by which the unit may be adjusted with respect to the support and the projections 195 or $195^a$ be adjusted on the bars. The controller arm 188 is also provided with a pointer 210 movable over said scale whereby adjustments of the controller may be facilitated.

It is necessary that the controller arm 188 be raised from engagement with the controller at the end of its movement and before the talking machine is moved to present a new record and a new controller unit. Means for accomplishing this result comprises the lever 212 fixed to the controller arm 62 of the talking machine, and extended beneath the reproducer control arm 188. Said control arm, in its movement to elevated position, serves to also raise the controller arm 188 to permit the turning of the controller. Said controller arm, for this purpose is pivotally supported at 213 to the rack 183. A rest for the arm 212 when in lowered position is shown at $212^a$.

It will be noted that spring washers and other means have been provided on the talking machine and the controller to automatically take up the loose play in respective parts of the apparatus as such loose play occurs during the use of the machine, whereby the initial accuracy of synchronism of the talking machine and picture exhibiting machine will be maintained.

The stereopticon or picture exhibiting machine associated with the talking machine for the presentation of still pictures and the like to illustrate the selections presented by the talking machine is arranged for dissolving views. Certain features thereof are illustrated in Patent No. 1,151,221.

The stereopticon comprises the two independent and similar slide holders 215 and 216 rotatably supported on the shaft or post 217 which is fixed at its ends to the frame 218 of the machine.

Each slide holder comprises the disc 219 upon which a plurality of spring plates 220, arranged in pairs, are supported. Slides are adapted to be removably held between each pair of plates. The periphery of the disc is provided with a plurality of pins 221 by which the slide holder is moved for the presentation of a new slide, and may also bear a series of numbers to denote the number of the slides in the total series of slides. The slides in the two holders are alternately numbered; that is, the slides bearing the even numbers are in one holder and those bearing the odd numbers are in the other holder, and the slides in the two holders are alternately presented. An arm 222 fixed to the supporting post 217 beneath the slide holder bears the pointer 223 to indicate the slide that is presented and a spring finger 224 carried by said arm is adapted to yieldingly engage the pins 221 to hold the slide holder in adjusted position.

The light house 225 and lenses 226 and 226ª are of usual construction. Two such houses and sets of lenses are provided, one for each slide holder, and are supported, one above the other, on the standard 227.

The stereopticon is operated by the electric motor 228 which operates, through the belt 229 the worm 230. Said worm is in mesh with the worm gear 231 fixed to the shaft 232 which is extended upwardly beside the slide holders and comprises the operating shaft by which the operations of the stereopticon are performed. The operation of the motor is controlled by the controller above described and by means under control by the stereopticon hereinafter to be described.

The slides contained in the slide holder are adapted to be moved from the holder to a position between the lens 226 and the light house where they are supported by the table 235. For this purpose a frame 236 is provided. Said frame is carried by the rod 237 which is slidably supported by the bearing 238 secured to said post 217 above the slide holder. Said frame 236 is normally in such position that the plates in the slide holder may pass between its arms. For the presentation of a slide, the frame is moved outwardly and the inner arm 236ª thereof engages the edge of a slide and moves it from the slide holder onto the table 235. In the withdrawing of the presented slide the outer arm of the frame engages the slide and returns it to its holder.

The rod 237 is reciprocated in its bearing 238 by the arm 240 which is fixed to a sleeve 241 supported on a supporting post 242 fixed to the frame of the stereopticon and retained in position thereon by the collars 243. A link 244 serves to pivotally connect the end of said arm 240 with the end of said rod 237 for its reciprocation.

The gear 231, and for the upper slide holder, a plate 245 fixed to said shaft 232 has two pins which rise therefrom, one, a long pin 246 which serves to return the presented slide to its holder, and the other a short pin 247 which serves to move a slide out for presentation.

The sleeve 241 is provided with a cam member fixed thereto having the projecting cam portion 248 which is higher above said cam gear 231, or plate 245, than is another cam portion 249 of said member. Said cam portion 249 has a slot 250 therein and a cam surface 251 which is adapted to be engaged by the short pin 247.

When in the position in which the slide frame 236 is in an outward position for the presentation of a slide, the cam 249 is beyond the path of movement of said pins but the cam 248 is moved into the path of movement of the long pin 246; but is of such a height that it is above the short pin 247. When in this position, the rotation of the shaft 232 by the motor causes the long pin 246 to engage said projection or cam 248 to move the presented slide back to its holder. This movement in an obvious manner. This movement causes the cam 249 to be moved over the gear or plate, and the short pin 247 is moved into the slot 250 and against the cam surface 251 to thereby again move the slide frame 236 outward for the presentation of a new slide, the slide holder having been previously moved to position the new slide for presentation.

The slide holder is rotated the distance of a slide by the tooth 252 carried by said gear 231 and plate 245 which, at the proper period, engages a pin 221 of the slide holder for such rotation. The pins 246 and 247 and the tooth 252 are so relatively positioned on the gear and plate that the proper sequence of operations is performed.

The operating and control mechanism for the two slide holders is so relatively arranged that the two parts of the stereopticon will be alternately operated for the presentation of their slides and that when a slide is being presented by one part, a slide is in position for presentation by the other part, but is not illuminated. At the proper period the illumination of the first slide is gradually decreased and the second slide is gradually illuminated, to obtain the dissolving feature, and when the first slide is dark, the shifting of slides takes place.

The alternate gradual variation of illumination of the two slides is automatically performed during the motor operation and is under the control of the stereopticon. The sources of illumination are incandescent lights enclosed in the light houses of which in Fig. 23, 253 represents the light for the upper part, and 254 the light for the lower part of the stereopticon.

An arm 255 is fixed to said motor driven shaft 232 and is rotatable therewith. Said arm bears the brushes 256, 256ª, 256ᵇ which are electrically connected and insulated from said arm 255. A plate 257 is arranged concentric with but independent of said shaft 232 beneath said brush and is supported by the post 242. An inner collector ring 258 is carried by said plate with which the brush 256ᵇ is in continual engagement. An intermediate segment 259, associated with the lamp circuit for the lower unit of the stereopticon, is carried on the face of said plate and terminates at each end in bared resistance coils 259ª the convolutions of which are adapted to be engaged by the brush 256ª during the movement of said arm 255 in the direction of the arrow to first gradually increase the illumination of the lower lamp by cutting out resistance in the lower lamp circuit and then to gradually decrease the illumination thereof by cutting in resistance and, finally, by breaking the circuit. An outer segment 260 for the upper lamp is similarly arranged on said plate 257 and terminates in the resistance coils 260 at each end and said brush 256ª is adapted to engage said segment and coils. It will be noted that the resistance coils of the outer and intermediate segments are opposite each other whereby the illumination of one lamp is gradually decreased while that of the other is gradually increased, to provide for the dissolving effect and that the circuit of one lamp is, preferably, broken during the period of maximum illumination of the other lamp.

A feature of the invention is the provision of means, as a counting device, whereby, when the controller fails to operate when controlled by the controller, the next time the controller is operated, the stereopticon will operate twice, or if the stereopticon fails to operate upon a number of control impulses from the controller, when it finally does operate it will operate without intermission, the number of times it has failed to operate, whereby synchronism between the presentation of the contents of the talking machine and the slides of the stereopticon obtains.

The means whereby this result is attained comprises the commutator formed of a disc of insulating material 262 bearing the spaced, radially arranged commutator segments 263ª which have peripheral contacting portions. Said commutator is fixed to and supported by said post 217 above the stereopticon slide holder. An unbroken collector ring 263 is arranged on the peripheral face of said commutator disc below said commutator segments but insulated therefrom and a motor lead is adapted to be in permanent connection therewith. A disc 264 bearing in its periphery as many pins 265 as there are commutator segments is rotatably supported on said post 217 and a standard 266 extends upwardly therefrom and bears the commutator 267 and collector ring brush 268 which are electrically connected. Said brush ring with brushes is adapted to be intermittently moved by the engagement of the teeth 269 and 270 with said pins 265. Said teeth are arranged on a supporting plate 271 which is fixed to the motor driven shaft 232 and said plate is so located on said shaft with respect to the other stereopticon control devices arranged thereon that the proper sequence of operations is carried out.

An arm 272 fixed to said post 217 bears a pointer to indicate the particular commutator segment through which the control of the stereopticon at any instant during the operation thereof is effected and a spring 274 engageable with said pins 265 serves to releasingly hold the disc 264 in adjusted position.

As many commutator segments are employed as there are slides in both slide holders; and all of said segments are electrically connected in sets to the various controller bars 194$^b$, 194$^c$ and 194$^d$ through the controller brushes 208$^b$, 208$^c$ and 208$^d$.

If it is desired that the stereopticon be brought into synchronism with the story on the records after, say, five successive failures to operate, then there will be seven bars as 194$^b$, 194$^c$ and 194$^d$ to each controller unit and successive commutator segments are connected to successive controller bars. Every seventh commutator segment will be connected to the same controller bar. The commutator brush will be arranged to bridge over six commutator segments and connect them with the common collector ring for the control of the motor circuit as will be hereinafter described.

For absolute synchronism each commutator segment should be independently connected to a bar or contact point on the controller and the commutator brush should then bridge all but one of the segments but, because of the impracticability of such an arrangement and because of the improbability of more than one successive failure to operate, a simplified arrangement is employed.

As here shown the stereopticon is arranged to be self correcting or to be automatically brought into synchronism after one failure to operate. Three controller bars 194$^b$, 194$^c$ and 194$^d$ are provided for each controller unit and their successive commutator segments as 263$^a$, 263$^b$ and 263$^c$ are connected thereto through the three rings 277$^a$, 277$^b$ and 277$^c$ which are connected with said controller rings through circuit wires 278$^a$, 278$^b$ and 278$^c$. The commutator brush 267 is adapted to always bridge two adjacent segments.

The control circuit, during the operation of the machine, is adapted to be successively made, first through bar 194$^b$, then 194$^c$, and last 194$^d$, and the projections or contact members 195 or 195$^a$, are adapted to be successively arranged as in Fig. 20.

The motor circuit is adapted to be initially completed through the controller bar 194$^a$ and one of the bars 194$^b$, 194$^c$ or 194$^d$ and through a commutator segment and the ring 263 of the commutator disc and the motor consequently is started in rotation for the operation of the stereopticon.

After the motor has started the control thereof is taken from the controller and transferred to the stereopticon. For this purpose a disc 280 is arranged about said drive shaft 232 but independent thereof and is supported by the post 242. Said disc bears the concentric spaced-apart segments 281 and 282 which extend through about 90 degrees and are connected across the commutator and controlling circuit to thereby bridge said circuit when a connection is made between said segments 281 and 282.

Two segments bridging brushes 283 and 284 are carried by the arm 285 fixed to said drive shaft and rotatable therewith and move over the face of said disc 280 during the rotation of said shaft, and during proper intervals, bridge the segments 281 and 282 whereby the motor will continue to rotate regardless of the fact that the control circuit may be broken at the controller or at the commutator.

Figure 14:
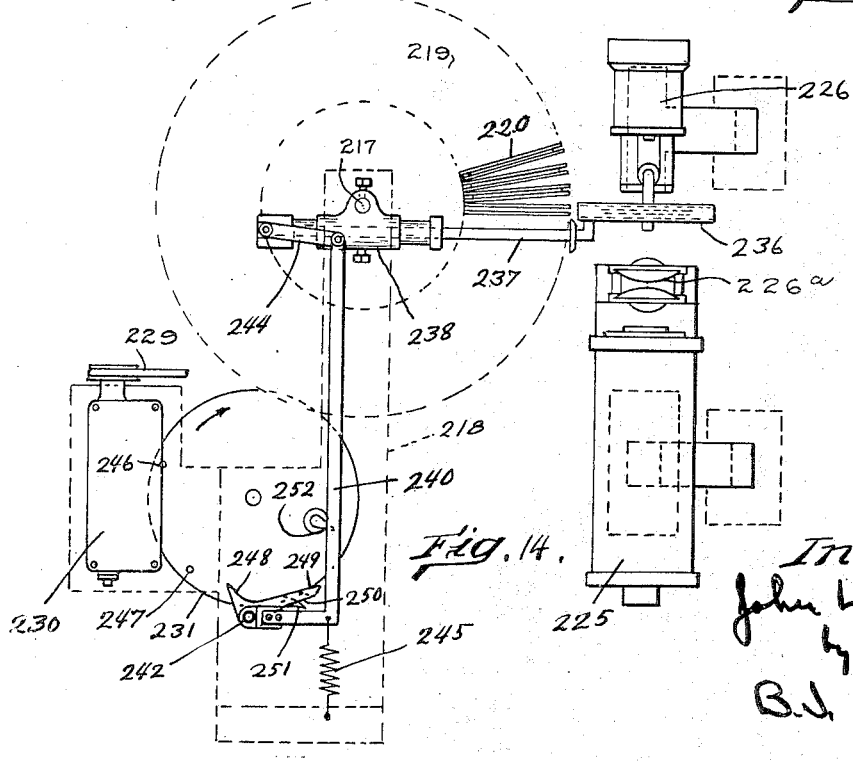
Fig. 14 is a plan view of the picture exhibiting machine.

The operation of the stereopticon is as follows: In the relative position of the component parts as shown in Figs. 14 and 20, the last slide of the series may be illuminated in the upper stereopticon unit, and the control circuit is open at the commutator, controller and motor controlled, or shunting, switch. A continued movement of the controller arm 188 causes the contact member associated with the finger 189$^b$ to engage a projection 195, or 195$^a$, of controller bar 194$^b$ and the circuit is established through said bar and bar 194$^a$ of the controller, and commutator segment 263$^a$ and ring 263 through the motor, which consequently operates and the light is gradually decreased in the upper and increased in the lower light house, and when the upper lamp is dark the slide is shifted. The rotation of the shaft moves a brush, as 283, into bridging connection with the segments 281 and 282 and the controller and commutator are shunted.

A continued movement of the motor then operates to move the commutator brush ahead a segment to break contact with segment 263$^b$ and to bridge the segments 263$^a$ and 263$^c$ and also to connect them with the ring 263. This shifting of the connection is without result upon the operation of the stereoptican for the controller circuit is shunted by the motor controlled switch. When the drive shaft has rotated a partial revolution the shunt circuit is opened by the passing of the brush 283 from the segments 281 and 282 and the motor stops with the slide in the lower stereopticon being presented. A further movement of the controller arm 188 causes the engagement of the contact member carried thereby with the contact projection 195, or 195$^a$, of controller bar 194$^c$ and another cycle of operations follow, the previously extended slide in the top unit being presented and the commutator brush being moved ahead another segment.

If, however, due to an imperfect contact between the brush and, say, segment 263$^a$, or between the contact member of the controller arm and, say, the bar 194$^b$ it is obvious that the motor control circuit will not be completed and the motor will not operate and the proper slide will not be presented. The selection on the record will continue to be presented, however, and presently one of the controller arm contact members will be moved into contact with the next successive controller bar 194$^c$ Assuming this contact to be good, and also the contact between the corresponding commutator segment 263$^b$, the motor circuit will be completed and the stereopticon started in operation. During such operation the brush will be moved ahead a segment. However, because the brush is now behind one segment, this forward movement merely moves it away from the faulty segment but does not break the motor circuit so that, when the motor driven switch has passed from shunting position, which would normally open the circuit, the motor circuit still completed and consequently the motor continues to operate to present without intermission the next slide. With the last operation the stereopticon is placed in synchronism with the talking machine and will continue so until a faulty connection is made and a similar operation will result.

If two successive faulty connections occur, however, upon the succeeding successful operation the stereopticon will be out of synchronism one slide. It is rare, however, for two successive failures to result, and provision may be made for it as previously described.

It may be seen that with the construction above set forth the necessary continued accuracy of presentation of the selections of the records and the slides is obtained.

It is to be noted that much of the construction of the above described apparatus is diagrammatically illustrated and that, obviously, refinements of design and construction may be employed.

I claim:—

1. In a combined talking and picture exhibiting machine, a controller to govern the operation of the picture exhibiting machine, means connecting the controller with a movable element of the talking machine for its movement, means to govern the presentation of the contents of a record of the talking machine, and means including adjustable members associated with said talking machine and controller which admits of the control of the picture exhibiting machine by the controller previous to the presentation of the contents of a record by the talking machine.

2. In combination, a talking machine arranged to present the contents of a record, a picture exhibiting machine arranged to present a series of pictures to illustrate the contents of the record, means to govern the presentation of the contents of the record, and means including adjustable members associated with the talking machine arranged to govern the operation of the picture exhibiting machine for the exhibition of pictures previous to the presentation of the contents of the record.

3. In combination, a talking machine arranged to present the contents of a plurality of records having a reproducer successively engageable with said records, a picture exhibiting machine arranged to present a series of pictures to illustrate the contents of said records, means including adjustable members associated with the talking machine arranged to govern the presentation of the contents of said records, and means to govern the operation of the picture exhibiting machine for the exhibition of pictures previous to the presentation of the contents of the records.

4. In a combined talking and picture exhibiting machine, a controller to govern the operation of the picture exhibiting machine, means connecting the controller with a movable element of the talking machine for its movement, said talking machine having a reproducer engageable with a record on the talking machine for the presentation of the contents thereof and means associated with said controller and talking machine which admits of the movement of the controller previous to the engagement of the reproducer with the record.

5. In a combined talking and picture exhibiting machine, a controller to govern the operation of the picture exhibiting machine, means connecting the controller with a movable element of the talking machine for its movement, said talking machine having a reproducer engageable with a record on the talking machine for the presenation of the contents thereof, and means to take up the lost motion in the controller and the talking machine previous to the engagement of the reproducer with the record.

6. In a combined talking and picture exhibiting machine, a controller for the picture exhibiting machine, means to govern the controller by the talking machine, a record receiving device associated with the talking machine, means to drive said device, a reproducer engageable with the record received by said device, and means to move the reproducer over the record on its playing stroke previous to its engagement with the record.

7. In a combined talking and picture exhibiting machine, a controller for the picture exhibiting machine, means to govern the controller by the talking machine, a record receiving device associated with the talking machine, means to drive said device, a reproducer engageable with the record received by said device, means to move the reproducer on its playing stroke, means to subsequently cause its engagement with the stationary record, and means to thereafter rotate the record.

8. The combination of a talking machine arranged to present the contents of a record, a picture exhibiting machine arranged for step by step operation to present a plurality of still pictures to illustrate the contents of the record, and controlling means for the picture exhibiting machine including, a movable member actuated by the talking machine to govern the operation of the picture exhibiting machine step by step for the presentation of its pictures in synchronism with the presentation of the contents of the record and means arranged to return the picture exhibiting machine into synchronism with the talking machine upon its departure from synchronism.

9. The combination of a talking machine arranged to present the contents of a plurality of records in automatic succession, a picture exhibiting machine arranged for step by step operation to present a plurality of still pictures to illustrate the contents of the records, and controlling means for the picture exhibiting machine including, a movable member actuated by the talking machine to govern the operation of the picture exhibiting machine step by step for the presentation of its pictures in synchronism with the presentation of the contents of the records and means arranged to return the picture exhibiting machine into synchronism with the talking machine upon its departure from synchronism.

10. The combination of a talking machine arranged to present the contents of a record, a picture exhibiting machine arranged to present a plurality of pictures to illustrate the contents of the record of the talking machine, means associated with the talking machine arranged to repeatedly control the exhibiting machine to effect the presentation of a picture at each control operation, and means including a counting device rendered effective by said control means after a failure thereof to control the exhibiting machine, to effect the operation of the exhibiting machine a plurality of times in succession to restore synchronism between the picture exhibiting machine and talking machines.

11. In combination, a talking machine arranged to present the contents of a plurality of records in automatic succession, a plurality of picture exhibiting machines having means to contain a plurality of pictures and means to display said pictures alternately in automatic succession to illustrate the contents of said records, and timing means to operate said exhibiting machines alternately in succession in synchronism with said talking machine.

12. The combination of a multiple record talking machine having a reproducer arranged to engage the records in sequence to present the contents thereof, a picture exhibiting machine arranged to present a plurality of pictures to illustrate the contents of the records, means including a controller member for each record arranged automatically to present the contents of the records and the pictures to illustrate the same normally in synchronism, and means to restore the presentation of the pictures and the contents of the records into synchronism after a departure therefrom.

13. The combination of a multiple record talking machine arranged to present the contents of its records in automatic sequence, a picture exhibiting machine arranged to present a plurality of pictures in automatic sequence to illustrate the contents of the records of the talking machine, a controller governed by said talking machine including a plurality of contact members and brush members engageable with said contact members, and electro-responsive means governing the operation of said picture exhibiting machine including a plurality of electric circuits connecting said controller and electro-responsive means to operate said talking and picture exhibiting machines in synchronism and automatically return said machines to synchronism after a departure therefrom.

14. The combination of a talking machine arranged to present the contents of a plurality of records in automatic sequence, a picture exhibiting machine arranged to exhibit a plurality of pictures in automatic sequence to illustrate the contents of said records, and means automatically to operate said machines normally in synchronism and restore said machines to synchronism after a departure therefrom comprising electric controlling means for the picture exhibiting machine governed by the talking machine having cooperating contact members arranged to establish electrical contact to cause the picture exhibiting machine to operate and electro-responsive means, operable upon the failure of said contact members to establish electrical contact, to cause the picture machine to operate, upon the next establishment of electrical contact, a plurality of times to restore both machines to synchronism.

15. The combination of a talking machine arranged to present the contents of a plurality of records in automatic sequence, a picture exhibiting machine arranged to exhibit a plurality of pictures in automatic sequence to illustrate the contents of said records, and means to govern the synchronous operation of both machines including means governed by said talking machine initially to control said picture exhibiting machine, and means governed by said picture exhibiting machine to take the control from said talking machine and govern the further operation of said picture exhibiting machine.

16. The combination of a multiple record talking machine arranged for repeated operation having a reproducer arranged to engage the records in sequence to present the contents thereof, a picture exhibiting machine arranged repeatedly to exhibit a plurality of pictures to illustrate the contents of the records and means automatically to cause the repeated presentation of the contents of the records and the pictures in synchronism, and to restore the presentation of the pictures and contents of the records to synchronism after a departure therefrom.

17. The combination of a multiple record talking machine arranged to present the contents of a plurality of records in automatic succession having a single reproducer engageable with said records, a picture exhibiting machine arranged to exhibit a plurality of pictures in automatic succession to illustrate the contents of the records, and controller mechanism for causing the synchronous presentation of the contents of the records and the pictures, said controller mechanism having operating connections for moving the same in timed relation with the talking machine reproducer but at a relatively accelerated rate.

18. In combination, a talking machine arranged to present the contents of a plurality of records in automatic succession, a picture exhibiting machine having two elements each adapted to present a series of pictures to illustrate the contents of said records, means alternately to operate said elements successively to display in alternate relation an individual picture of each element, means which admits of said pictures dissolving one into the other in automatic succession, and means automatically to present repeatedly the contents of the records and pictures in synchronism.

19. The combination of a multiple record talking machine having a reproducer arranged to engage the records in automatic succession to present the contents thereof, a picture exhibiting machine arranged to display a plurality of pictures in automatic succession to illustrate the contents of the records, controlling means associated with said talking machine and picture exhibiting machine and all coordinated to present the contents of the records and the pictures in synchronism and means arranged to cause said reproducer to engage said records dependent upon the location of the beginning of the stories thereon.

20. The combination of a multiple record talking machine having a reproducer arranged to engage the records in automatic succession to present the contents thereof, a picture exhibiting machine arranged to display a plurality of pictures in automatic succession to illustrate the contents of the records, controlling means associated with said talking machine and picture exhibiting machine and all coordinated to present the contents of the records and the pictures in synchronism and means providing for a period of reproducer engagement with said individual records proportioned in each case to the effective length of the sound grooves therein.

21. The combination of a multiple record talking machine having a reproducer arranged to engage the records in automatic succession to present the contents thereof, a picture exhibiting machine arranged to display a plurality of pictures in automatic succession to illustrate the contents of the records, controlling means associated with said talking machine and picture exhibiting machine and all coordinated to present the contents of the records and the pictures in synchronism and means rotatably to support said records and means automatically to adjust and hold each record support in a predetermined position, previous to reproducer engagement with the record and release said supports when moved to record playing position.

In testimony whereof, I have signed my name to this specification, in the presence of two subscribing witnesses.

JOHN L. BOYLE.

Witnesses:
H. B. DAVIS,
T. T. GREENWOOD.